United States Patent

[11] 3,595,353

| [72] | Inventor | Jene A. Beneke |
| | | Dallas, Tex. |
| [21] | Appl. No. | 832,175 |
| [22] | Filed | June 11, 1969 |
| [45] | Patented | July 27, 1971 |
| [73] | Assignee | Verson Manufacturing Company |
| | | Dallas, Tex. |

[54] COUPLINGS WITH STATIONARY SPRING AND FLUID MOTOR
4 Claims, 5 Drawing Figs.

[52] U.S. Cl. ................................................. 192/18 A,
  92/130, 192/87.17, 192/85 CA
[51] Int. Cl. ............................................... F16d 67/04
[50] Field of Search .................................... 192/87.16,
  87.17, 85 C, 18.1

[56] References Cited
UNITED STATES PATENTS

| 2,406,417 | 8/1946 | Viviano | 192/87.17 X |
| 2,701,042 | 2/1955 | Kurzweil | 192/85 C-2 X |
| 2,909,255 | 10/1959 | Chung | 192/18.1 |
| 3,064,781 | 11/1962 | Schwartz | 192/87.17 |
| 3,177,994 | 4/1965 | Jewson | 192/18.1 |
| 3,256,542 | 6/1966 | Schubert | 192/87.17 X |

FOREIGN PATENTS

| 213,165 | 6/1960 | Australia | 192/85 C-2 |
| 852,648 | 10/1960 | Great Britain | 192/18.1 |

Primary Examiner—Benjamin W. Wyche
Attorney—Richards, Harris and Hubbard

ABSTRACT: A shaft is rotatably journaled through a stationary annular housing. Two sets of friction clutch plates are disposed on opposite sides of the stationary annular housing and are rotatable with the shaft when disengaged. A pair of annular pistons are slidable within circular chambers defined on opposite sides of the stationary housing, with fluid pressure being selectively applied to the annular pistons such that one of the pistons compresses and engages one set of the friction clutch plates. A number of rigid connecting members connect the two annular pistons such that only one set of the friction clutch plates are engaged at a time.

INVENTOR
JENE A. BENEKE

INVENTOR:
JENE A. BENEKE

INVENTOR:
JENE A. BENEKE

Richards, Harris & Hubbard
ATTORNEY

COUPLINGS WITH STATIONARY SPRING AND FLUID MOTOR

FIELD OF THE INVENTION

This invention relates to clutch mechanisms, and more particularly to low inertia clutch systems for presses, press brakes and the like.

THE PRIOR ART

It is often desirable in many machines to selectively engage or disengage duplex or back-to-back clutches mounted on a rotating shaft. For instance, in certain types of two-speed transmission systems, selected ones of duplex clutches mounted about a rotating shaft are energized in order to vary the speed of the shaft. An example of such a system is described in the copending patent application Ser. No. 672,249, filed by Jene A. Beneke et al. on Oct. 2, 1967 and assigned to the present assignee. Additionally, in certain systems it is desirable to frictionally connect a driving shaft with a coaxially aligned driven shaft, with a braking force being automatically applied to the driven shaft when the driving shaft is disconnected therefrom. Examples of such clutch-brake mechanisms are described in U.S. Pat. No. 2,213,111, issued to Strout on Aug. 27, 1940 and U.S. Pat. No. 3,182,762 to Sommer.

In previous actuating mechanisms for duplex clutch systems, problems have arisen due to the relatively high inertia of the housing containing the actuating mechanisms. This high inertia increases the load imparted upon both the driving and braking systems, and sometime leads to unnecessary mechanical difficulties, as well as requiring a larger clutch and brake. With particular respect to previously developed systems as exemplified by U.S. Pat. No. 2,213,111 issued to Strout, the rotation of the actuating mechanism housing with the rotating shaft not only increases the inertia of the system, but requires undesirable application of hydraulic fluid through the rotating shaft. Additionally, mechanisms exemplified by the Strout patent have heretofore generally required a plurality of individual piston members disposed about the periphery of the housing, thereby sometimes resulting in uneven application of pressure to the clutch plates.

SUMMARY OF THE INVENTION

In accordance with the present invention, a low inertia clutch system includes a stationary housing with a freely rotatable shaft extending through and journaled within the housing. Two sets of friction clutch surfaces are carried about the rotatable shaft on opposite sides of the stationary housing. A pair of interconnected annular pistons are slidably disposed within annular chambers defined in opposite sides of the stationary housing. Fluid pressure is selectively directed against at least one of the pistons in order to force the piston outwardly from the housing to engage one of the sets of friction clutch surfaces. The use of the annular pistons substantially increases the area of pressure application, thereby providing increased clutch-torque capability.

In accordance with a more specific aspect of the invention, structure is provided to rigidly interconnect the annular pistons disposed in the chambers within the stationary housing, such that the pistons slide in the same direction within the chambers, thereby preventing engagement by both pistons.

In accordance with another aspect of the invention, springs are disposed within one of the chambers within the stationary housing to normally bias one of the annular pistons against a set of friction clutch surfaces which in this case act as a brake. Fluid under pressure applied to the other of the pistons overcomes the spring bias to compress the other set of the friction clutch surfaces, thereby engaging the clutch and disengaging the brake. Because the brake is spring set, when pressure is relieved from the piston biasing the friction clutch surfaces, or upon accidental loss of fluid pressure, the brake will be automatically spring set.

In accordance with another aspect of the invention, separate inlets for the application of fluid pressure are defined through the stationary housing, with fluid pressure being directed through only one of the inlets at a time for forcing one of the pistons outwardly from the housing. A plurality of rigid interconnecting bolts cause the other annular piston to be moved inwardly into the housing to prevent an undesired actuation of the other set of friction clutch surfaces.

THE DRAWINGS

For a more complete understanding of the present invention and for further objects and advantages thereof, reference is now made to the following description taken in conjunction with the accompanying drawings in which.

DESCRIPTION OF THE PREFERRED EMBODIMENTS

Figure 1:
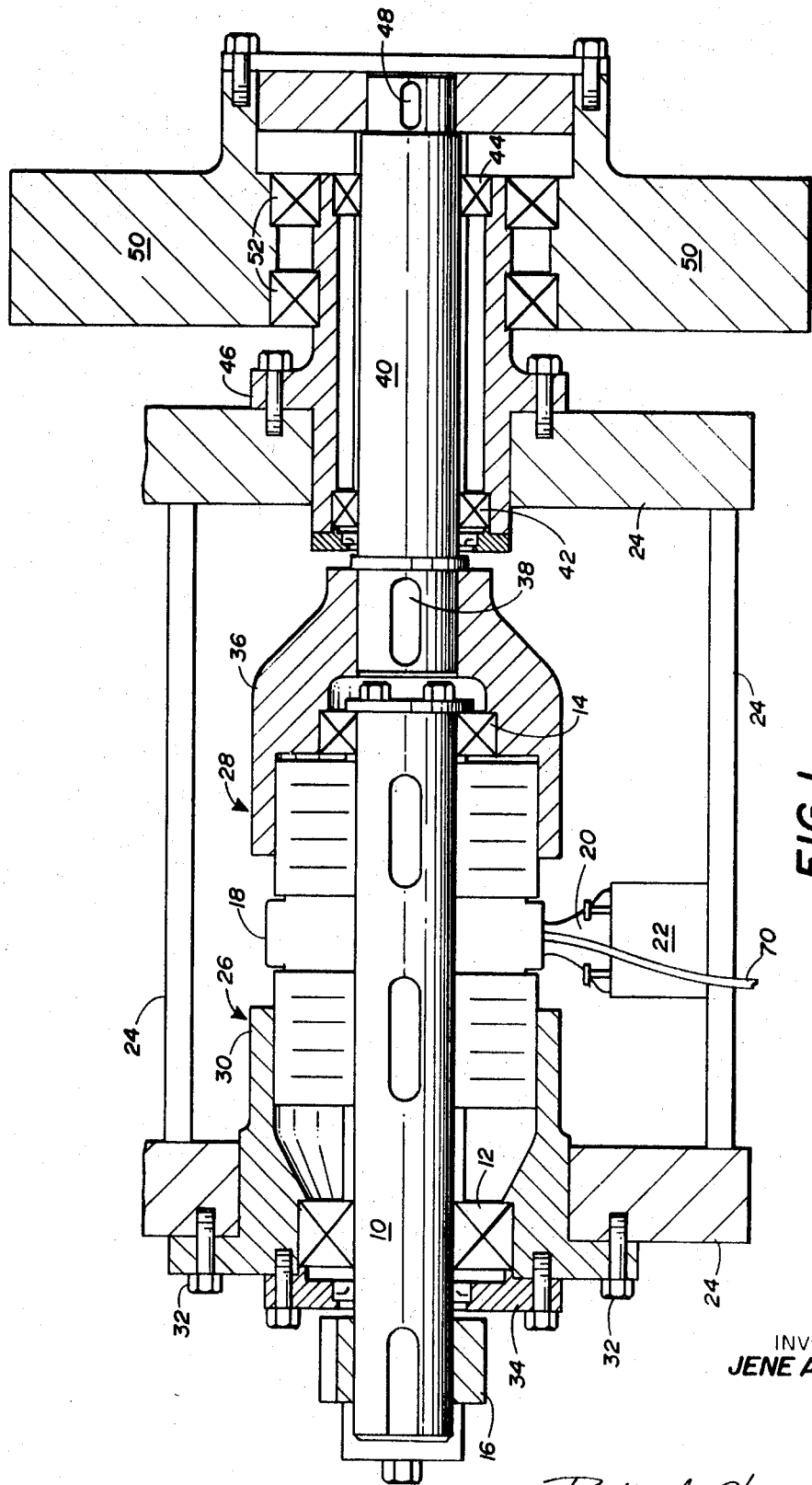
FIG. 1 is a somewhat diagrammatic view of the preferred clutch-brake system of the invention.

FIG. 1 illustrates the preferred embodiment of the invention comprising a clutch-brake mechanism which is particularly useful in connection with presses and press brake systems. A shaft 10 is journaled for free rotation in bearings 12 and 14. An end of the shaft 10 is connected to a gear 16 which is utilized to drive a gearing mechanism in a press brake or other machinery. Shaft 10 extends through a stationary annular housing 18 which is fixedly attached via a pedestal 20 to a frame extension 22. Housing 18 contains the clutch actuating mechanism of the invention, and will be discussed later in greater detail. Frame extension 22 is connected to the housing 24 which houses the clutch-brake structure. A pair of clutches 26 and 28, to be later described in detail, are carried about the shaft 10 on opposite sides of the stationary housing 18. A stationary spider 30 engages friction plates of the clutch or brake 26 and is connected by bolts 32 to the housing 24. Spider 30 also supports the bearing 12 through which the shaft 10 is journaled. An end cap 34 is bolted onto the spider 30 in order to maintain the bearing 12 in position.

A rotating spider 36 engages friction plates of clutch 28, spider 36 being connected by a key 38 to a rotating driving shaft 40. Shaft 40 is journaled in bearings 42 and 44 which are carried by a support housing 46. Housing 46 is rigidly bolted to the housing 24. The outer end of the shaft 40 is connected by a key 48 to a flywheel 50. Flywheel 50 is journaled in bearings 52 about the support housing 46. Flywheel 50 is driven through suitable belt drive means, not shown, by a generally constant speed motor as is conventional in press and press brake systems.

Figure 2:
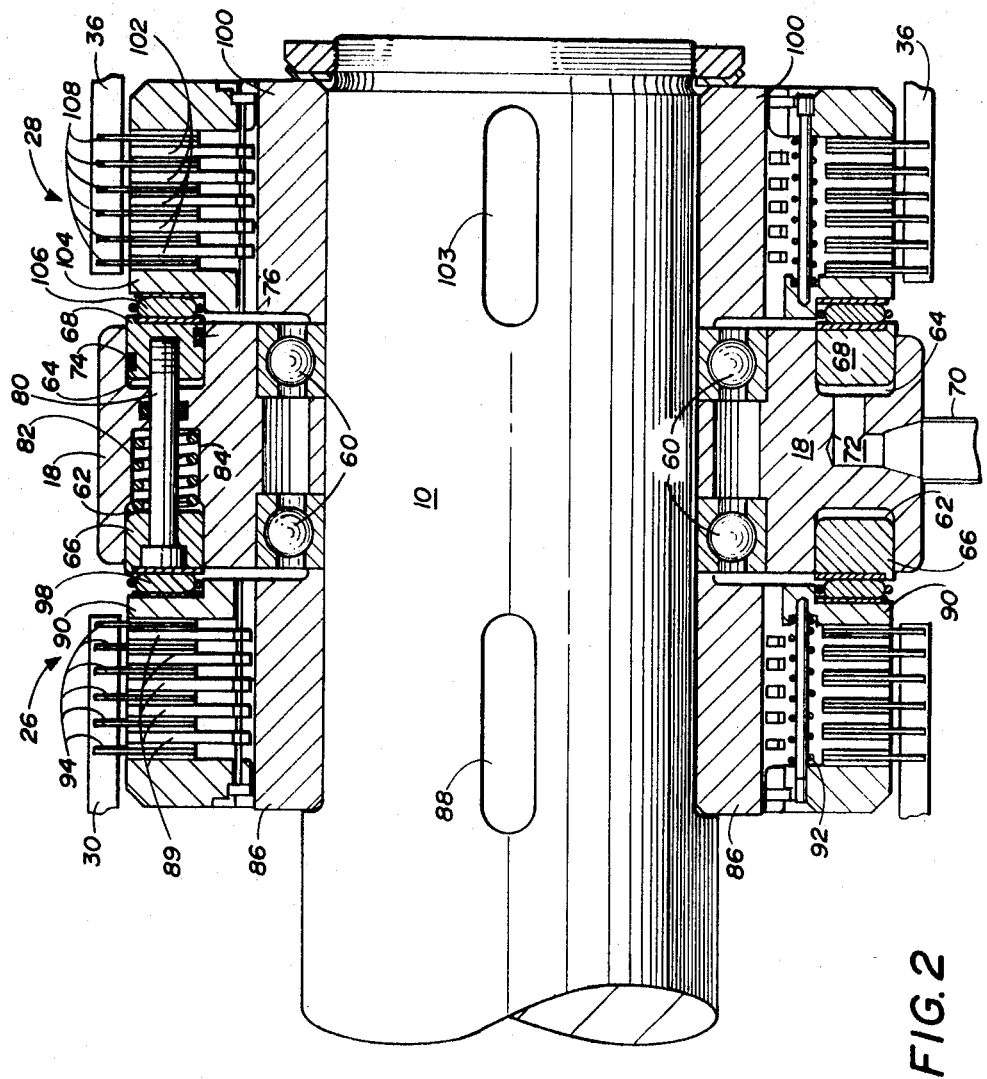
FIG. 2 is a partially sectioned enlarged view of the system shown in FIG. 1.

FIG. 2 shows the clutch mechanism of FIG. 1 in greater detail. The annular stationary housing 18 is supported by the shaft 10 through radial thrust ball bearings 60 to enable free rotation of the shaft 10 with respect to the stationary housing 18. A pair of annular chambers 62 and 64 are defined in opposite sides of the housing 18. An annular piston 66 is slidably disposed within chamber 62, while an annular piston 68 is slidable within the chamber 64. In some cases, it may be desirable to eliminate one or more of the sidewalls of the chamber 62. Hydraulic fluid under pressure from a suitable source, not shown, is supplied to the chamber 64 via a conduit 70 and through an inlet 72. A suitable hydraulic system for controlling the application of fluid to FIG. 2 is described in the copending patent application Ser. No. 773,140 filed Nov. 4, 1968, by Jene A. Beneke. Pistons 66 and 68 are preferably constructed from a suitable metal and are dimensioned as as to slide freely within chambers 62 and 64. O-rings 74 and 76 are provided to prevent hydraulic leakage past the piston 68.

An important aspect of the invention is the rigid connecting bolt 80 which rigidly interconnects pistons 66 and 68. While only one bolt is illustrated in the drawings, in practice a number of similar bolts, from six to eight in number, will be spaced about the annular rings 66 and 68. Additionally, at the location of each of the bolts 80, a biasing spring 82 is disposed about the bolt 80 within a chamber 84 in housing 18. Spring 82 normally biases the piston 66 outwardly from the housing 18 so that the brake is energized when no pressurized hydraulic fluid is applied to the system.

The brake clutch 26 comprises an annular housing 86 which is connected for rotation with the shaft 10 by a key 88. Housing 86 carries a number of friction surfaces designated generally by the numeral 89. An annular pressure plate 90 is normally biased outwardly by a spring 92 within the housing 86. A plurality of friction clutch plates 94 are interdisposed between the friction surfaces 89, the outer peripheries of the friction plates 94 being interconnected with the spider 30. Roller thrust bearings 98 are disposed between the pressure plate 90 and the piston 66 to enable relative rotation of the housing 86 and the pressure plate 90 with respect to the stationary housing 18.

Clutch 28 is similar in construction to clutch or brake 26, and comprises an annular support member 100 which carries a plurality of annular friction surfaces 102. Support member 100 is connected to shaft 10 by a key 103. An annular pressure plate 104 is disposed between the clutch 28 and the piston 68, with a roller thrust bearing 106 being provided to allow relative rotation between the piston 68 and the plate 104. A plurality of clutch friction plates 108 are interdisposed between the friction surfaces 102, with the outer peripheries of the friction clutch plates 108 being connected for rotation by the spider 36.

The operation of the system shown in FIGS. 1 and 2 will be apparent. When no pressurized hydraulic fluid is applied via the conduit 70, the springs 82 in housing 18 force the piston 66 outwardly from housing 18. This movement causes the annular pressure plate 90 to be moved to compress the friction surfaces 89 and friction clutch plates 94 of clutch 26. This frictional engagement transmits a braking motion through the stationary spider 30 through the annular housing 86 to the shaft 10. Due to the interconnection of the piston 66 with piston 68 through the bolts 80, piston 68 is drawn inwardly into the housing 18 to prevent actuation of the clutch 28 when the brake is energized.

When it is desired to deenergize the brake and to connect the shaft 10 with the rotating flywheel 50, pressurized fluid is applied through the conduit 70 and through the inlet 72 into chamber 64. This fluid pressure forces the piston 68 outwardly from the housing 18 and through the thrust bearings 106 to the pressure plate 104. Pressure plate 104 thus compresses the friction surfaces 102 against the friction plates 108 to energize the clutch 28. Rotative motion from the flywheel 50 is transmitted through the spider 36 and through the clutch 28 to the shaft 10. Due to the relatively low silhouette and compact shape of the housing 18, and due to the fact that the housing 18 remains stationary and does not rotate, the present clutch provides an extremely low inertia system for a integral nonoverlapping clutch-brake.

Figure 3:
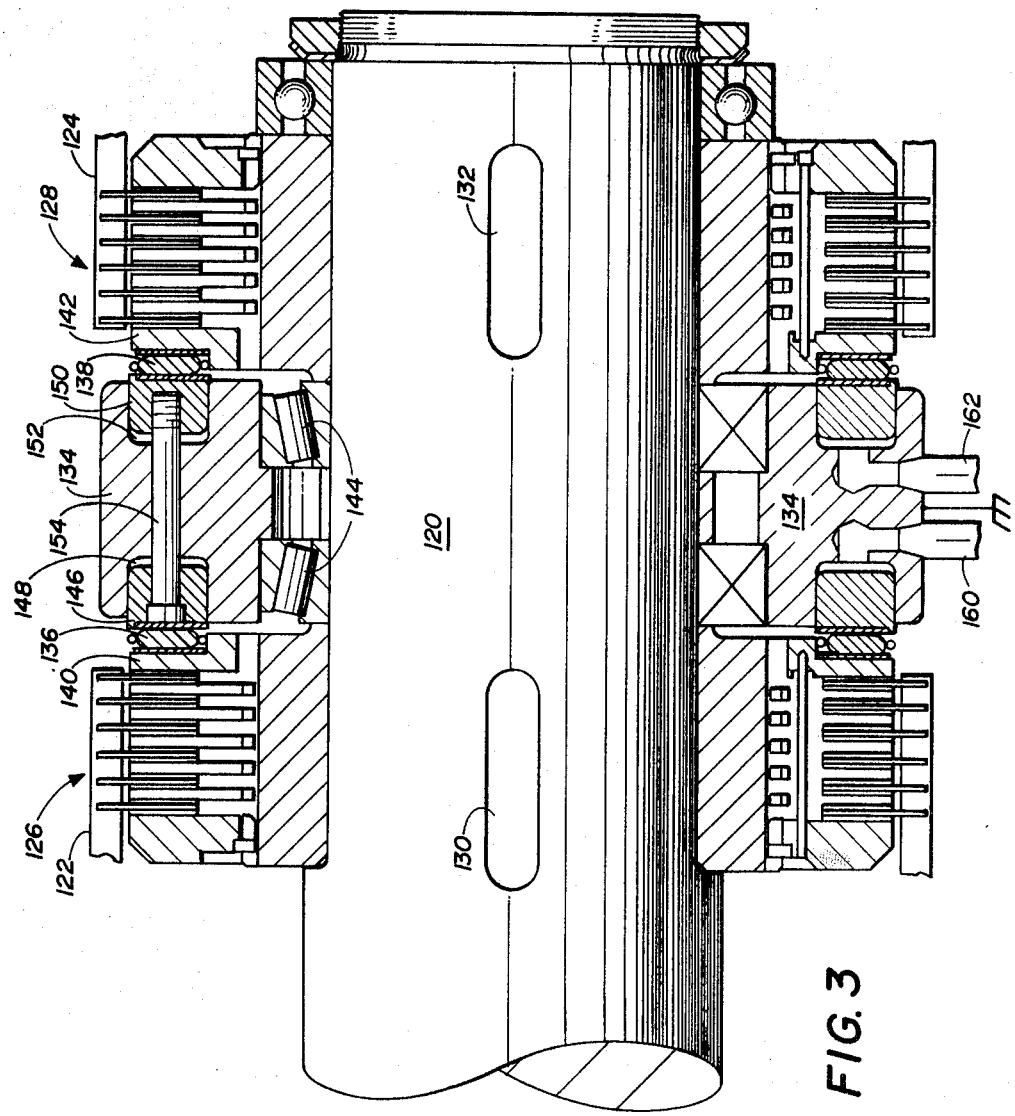
FIG. 3 is a partially sectioned view of the dual clutch embodiment of the invention.

FIG. 3 illustrates another embodiment of the invention. This embodiment provides selective operation of a shaft 120 in either of two different speeds. The system comprises a rotating spider 122 rotated at a first speed and a spider 124 rotated at a second speed. The driving portions of the spiders in the accompanying driving system have been omitted for simplicity of illustration. A suitable two-speed driving system is shown and illustrated in the previously identified patent application Ser. No. 672,249, filed by Jene A. Beneke. Spider 122 is connected to a clutch 126 and spider 124 is connected to a clutch 128, the duplex clutches being similar to those illustrated in FIGS. 1 and 2. Clutches 126 and 128 are respectively connected to the shaft 120 by keys 130 and 132. A stationary housing 134 is disposed between the clutches 126 and 128 in the manner shown in FIGS. 1 and 2. Roller thrust bearings 136 and 138 are disposed between the stationary housing 134 and between slidable pressure plates 140 and 142. The stationary housing 134 includes radial thrust tapered roller bearings 144 to enable the shaft 120 to freely rotate with respect to housing 134.

An annular piston 1—6 is slidably disposed within a chamber 148 in the housing 134. A similar annular piston 150 is slidably disposed in a chamber 152 within the housing 134. The pistons 146 and 150 are rigidly joined by a plurality of bolts 154, only one of which is illustrated. A hydraulic fluid conduit 160 provides a supply of pressurized hydraulic fluid to the chamber 148, while a conduit 162 provides pressurized hydraulic fluid to the chamber 152.

In operation of the embodiment shown in FIG. 3, pressurized hydraulic fluid is supplied through one of tee conduits 160 or 162. A suitable hydraulic system for selective application of hydraulic fluid to such inlets in a two-speed transmission system is described in the previously identified copending patent application Ser. No. 672,249. For instance, if pressurized fluid is supplied via conduit 160, the annular piston 146 compresses the friction surfaces of clutch 126 to thereby energize clutch 126. As the annular piston 146 and 150 are rigidly interconnected, piston 150 is withdrawn into the housing 134 and clutch 128 is deenergized. Similarly, if pressurized fluid is supplied via conduit 162 into the chamber 152, piston 150 moves outwardly from the housing 134 in order to energize the clutch 128 to drive the shaft 120 at a different speed. In this mode of operation, the piston 146 is withdrawn into the housing 134 to insure that the clutch 126 is deenergized.

Figure 4:
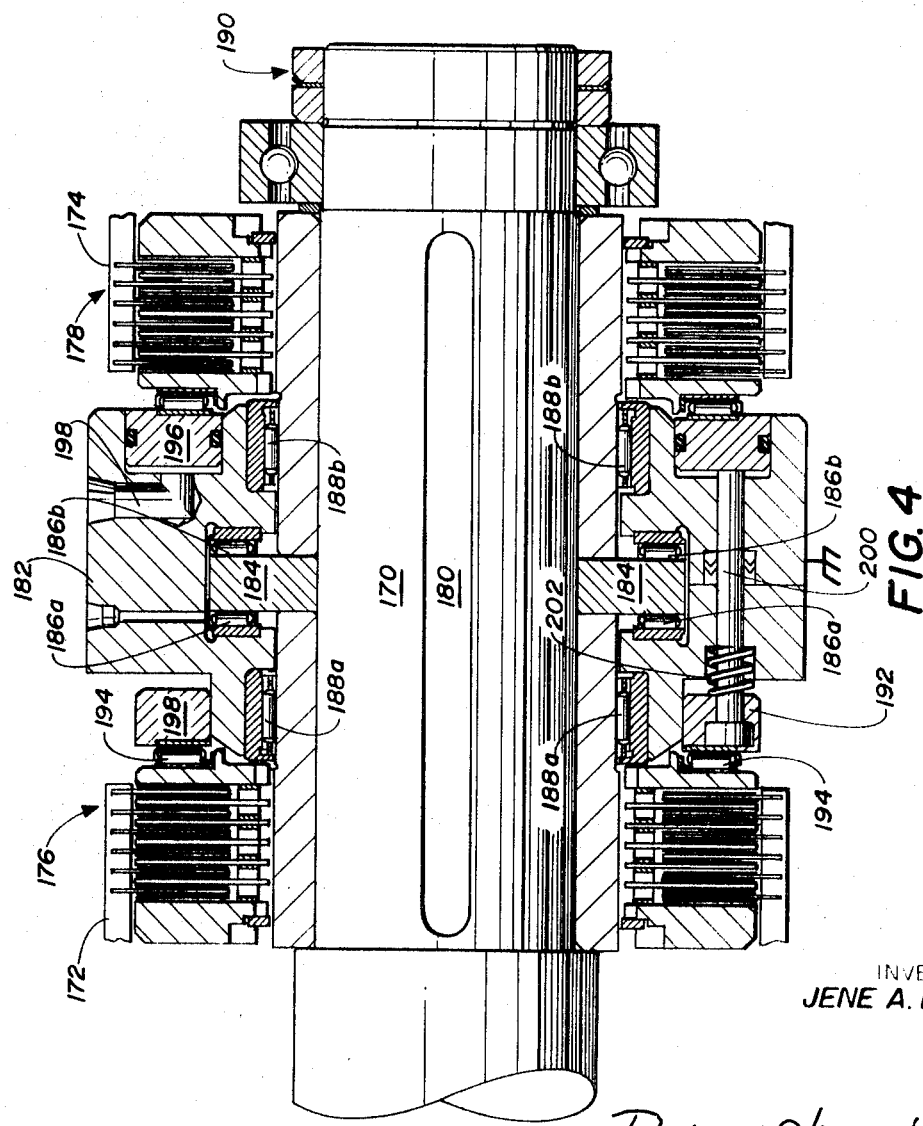
FIG. 4 is a partially sectioned view of another embodiment of the invention.

FIG. 4 illustrates yet another embodiment of the invention wherein a unique bearing arrangement is provided. In this system, either a braking or driving action may be selectively applied to the shaft 170. A first spider 172 is connected to a braking structure while a second spider 174 is rotated by a driving member. The driving portion of the spider has been omitted for simplicity of illustration. Spider 172 is connected to the outer peripheries of the plates of a clutch 178. The housing structures of the clutches 176 and 178 are connected for rotation with the shaft 170 by a key 180. A stationary housing 182 is disposed between the clutches 176 and 178 in the manner previously described. An annular guide member 184 is connected for rotation with the shaft 170 by the key 180. Needle thrust bearings 186a—b are disposed between the guide member 184 and interior surfaces of the stationary housing 182. Bearings 188a—b are also provided in the housing 182 to permit relative rotation of the shaft 170 and housing 182. Clutches 176 and 178, and the stationary housing 182, are maintained in place about the shaft 170 by a locknut structure 190 in a conventional manner.

An annular piston 192 is slidably disposed in the housing 182 and normally bears against bearings 194 disposed adjacent the clutch 176. A second annular piston 196 is slidably disposed in a chamber in the side of housing 182. A conduit 198 is connected to a source of pressurized hydraulic fluid for selective actuation of the piston 196 in the manner previously described. Annular piston 192 is rigidly connected to piston 196 by a plurality of bolts 200, only one of which is shown. A spring 202 normally biases the piston 192 for energization of the clutch 176.

The operation of the system shown in FIG. 4 is similar to that previously described with respect to FIG. 2, wherein hydraulic fluid applied via conduit 198 against the piston 196 actuates the clutch 178. When the source of pressurized fluid is removed, spring 202 biases the piston 192 against the clutch 176 to brake the system.

Figure 5:
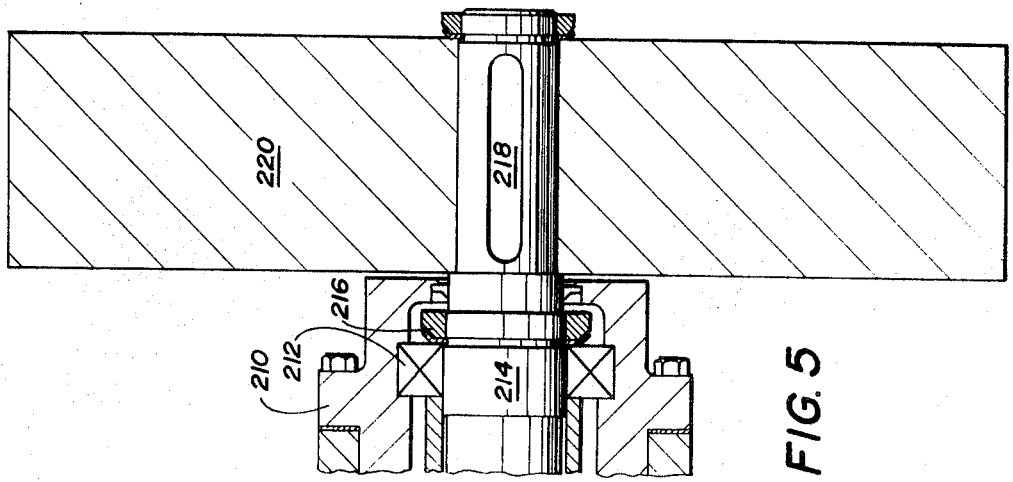
FIG. 5 is a view of another embodiment of a flywheel arrangement for use with the invention.

FIG. 5 illustrates another embodiment of a flywheel for use with the invention. A support sleeve 210 is adapted to be originally connected to the frame of the transmission such as that described in FIG. 1 or in subsequent figures. Bearings 212 are disposed about the shaft 214, and are abutted by locknut structure 216. The end of the shaft includes a key 218 within which is connected a conventional flywheel 220. This type of flywheel is normally termed a shaft-mounted flywheel, in contradistinction from the quill-mounted flywheel shown in FIG. 1.

Whereas the present invention has been described with respect to several specific embodiments thereof, it is to be understood that various changes and modifications will be suggested to one skilled in the art, and it is intended to encompass these changes and modifications as fall within the true scope of the appended claims.

I claim:
1. A low inertia clutch comprising:
a rotatable shaft,
a housing stationary disposed about said shaft and slidably carrying a pair of annular pistons concentrically disposed about said shaft,
a plurality of interconnecting bolts spaced about said annular pistons and rigidly interconnecting said pistons,
spring means disposed about said bolts for normally biasing one of said pistons away from said housing,
two sets of friction clutch surfaces carried about said shaft, each of said sets of clutch surfaces being disposed adjacent one of said annular pistons, and bearings disposed between said friction clutch surfaces and said annular piston means for selectively directing fluid pressure against one of said annular pistons to counteract said spring means to force said piston against the adjacent clutch surfaces.

2. The low inertia clutch of claim 1 and further comprising a stationary spider adapted to engage one of said sets of friction clutch surfaces and a rotatable spider adapted to engage said second set of friction clutch surfaces.

3. The low inertia clutch of claim 1 includes bearings for rotatably supporting said shaft.

4. A low inertia clutch comprising:
a rotatable shaft,
a housing disposed about said shaft and slidably carrying a pair of annular pistons concentrically disposed about said shaft,
interconnecting means spaced about said annular pistons and extending through said housing for rigidly interconnecting said pistons,
springs disposed about said interconnecting means for normally biasing one of said pistons away from said housing,
two sets of friction clutch surfaces carried about said shaft, each of said sets of said clutch surfaces being disposed adjacent one of said annular pistons, and
means for selectively directing fluid pressure through said housing against the inner surface of one of said annular pistons to counteract said springs to force said piston outwardly from said housing against the adjacent clutch surfaces.